United States Patent
Kurachi et al.

[11] Patent Number: 5,984,059
[45] Date of Patent: Nov. 16, 1999

[54] SUSPENSION SYSTEM

[75] Inventors: Makoto Kurachi; Mineo Yamamoto; Eiichirou Tsujii, all of Iwata, Japan

[73] Assignee: Yamaha Hatsudoki Kabushiki Kaisha, Iwata, Japan

[21] Appl. No.: 08/906,982

[22] Filed: Aug. 6, 1997

[30] Foreign Application Priority Data

Aug. 7, 1996 [JP] Japan .................................. 8-208186

[51] Int. Cl.⁶ ........................................................ F16F 5/00
[52] U.S. Cl. ........................ 188/318; 188/314; 267/186
[58] Field of Search ............................. 188/299.1, 314, 188/318, 322.13, 322.21; 280/124.157, 124.158, 124.159, 124.161; 138/30, 31; 267/186, 187

[56] References Cited

U.S. PATENT DOCUMENTS

| 4,973,854 | 11/1990 | Hummel | 188/314 |
| 5,024,250 | 6/1991 | Nakamura | 138/31 |
| 5,486,018 | 1/1996 | Sakai | 280/124.16 |

Primary Examiner—Robert J. Oberleitner
Assistant Examiner—Mariano Sy
Attorney, Agent, or Firm—Knobbe, Martens, Olson & Bear LLP

[57] ABSTRACT

A pair of combined accumulator and control devices for interconnected suspension units having a simplified construction and wherein unequal displacement of fluid from the associated suspension units will cause an increase in the effective damping of the suspension unit having the greatest fluid displacement.

30 Claims, 5 Drawing Sheets

SUSPENSION SYSTEM

BACKGROUND OF THE INVENTION

This invention relates to a suspension system and more particularly to an improved control arrangement for a vehicle suspension system wherein the suspension travel of two of the wheels is interrelated to each other.

U.S. Pat. No. 5,486,018 issued Jan. 23, 1996, shows a suspension system for vehicles wherein individual shock absorbing arrangements located at each wheel control the damping of that wheel. Pairs or more of these shock absorbers are, however, interrelated by means of an accumulator and flow control arrangement so as to provide an increase in the stiffness of the suspension system to control such things as pitch and/or roll.

This system utilizes a pair of accumulators, preferably formed by concentric portions of a floating piston assembly, that experience equal displacement when the same direction of loading and the same magnitude is applied to the two interrelated wheels. However, if one damping unit moves in one direction, and the other moves in the other, as is caused by either roll in the case of interconnected side units, or pitch, in the case of interconnected front and rear units, then the damping stiffens and these roll and/or pitch conditions can be controlled. A damping arrangement is provided for controlling the flow between the two chambers externally of the individual interconnected shock absorbers under this condition. This damping arrangement comes into effect when there tends to be unequal or opposite directions of fluid displacement.

Although the devices shown in that patent are quite effective, many of them embody relatively complicated structures that require the accumulator housing to be formed in principal part from a main casting. This adds considerably to the weight and cost of the system. In addition, the structures shown require considerable machining to accommodate the various piston and piston areas.

It is, therefore, a principal object of this invention to provide an improved accumulator and flow control arrangement of this general type.

It is a further object of this invention to provide an improved accumulator and flow control system for a vehicle suspension system that is relatively low in cost and light in weight.

Many of the embodiments disclosed in the aforenoted patent also have only fixed orifices that control the interrelation between the two suspension units. It is, however, desirable to be able to fine tune the system upon installation in the vehicle.

It is, therefore, a still further object of this invention to provide an improved accumulator and flow control device of this general type that embodies a simple yet easily yet externally adjusted damping arrangement.

SUMMARY OF THE INVENTION

The features of this invention are adapted to be embodied an accumulator and control device for interconnection between a pair of hydraulic damping units for controlling their respective damping action. This device comprises a housing assembly that includes a main housing member having a first cylinder bore closed at one end by an integral end wall and a detachable end cap affixed to the main housing member and closing the other end of the first cylinder bore. The end cap has a cylindrical extension extending coaxially into the first cylinder bore and which defines a second cylinder bore. A pair of integral, concentric pistons are received within the housing assembly. One of the pistons comprises an annular piston received in the first cylinder bore and forms with it a first fluid chamber. The other of the concentric pistons comprises a cylindrical piston received in the second cylinder bore and forming with the second cylinder bore and a second fluid chamber. A pair of fittings are carried by the end cap and communicate respective of the hydraulic damping units with the first and second fluid chambers.

In accordance with a first feature of the invention, a conduit has a flow control for interconnecting the fluid chambers and controlling the flow therebetween.

In accordance with a second feature of the invention, the portion of the conduit is formed in the end cap is provided with an externally adjustable flow control valve for further controlling the flow of fluid between the fluid chambers.

DETAILED DESCRIPTION OF THE PREFERRED EMBODIMENTS OF THE INVENTION

Figure 1:
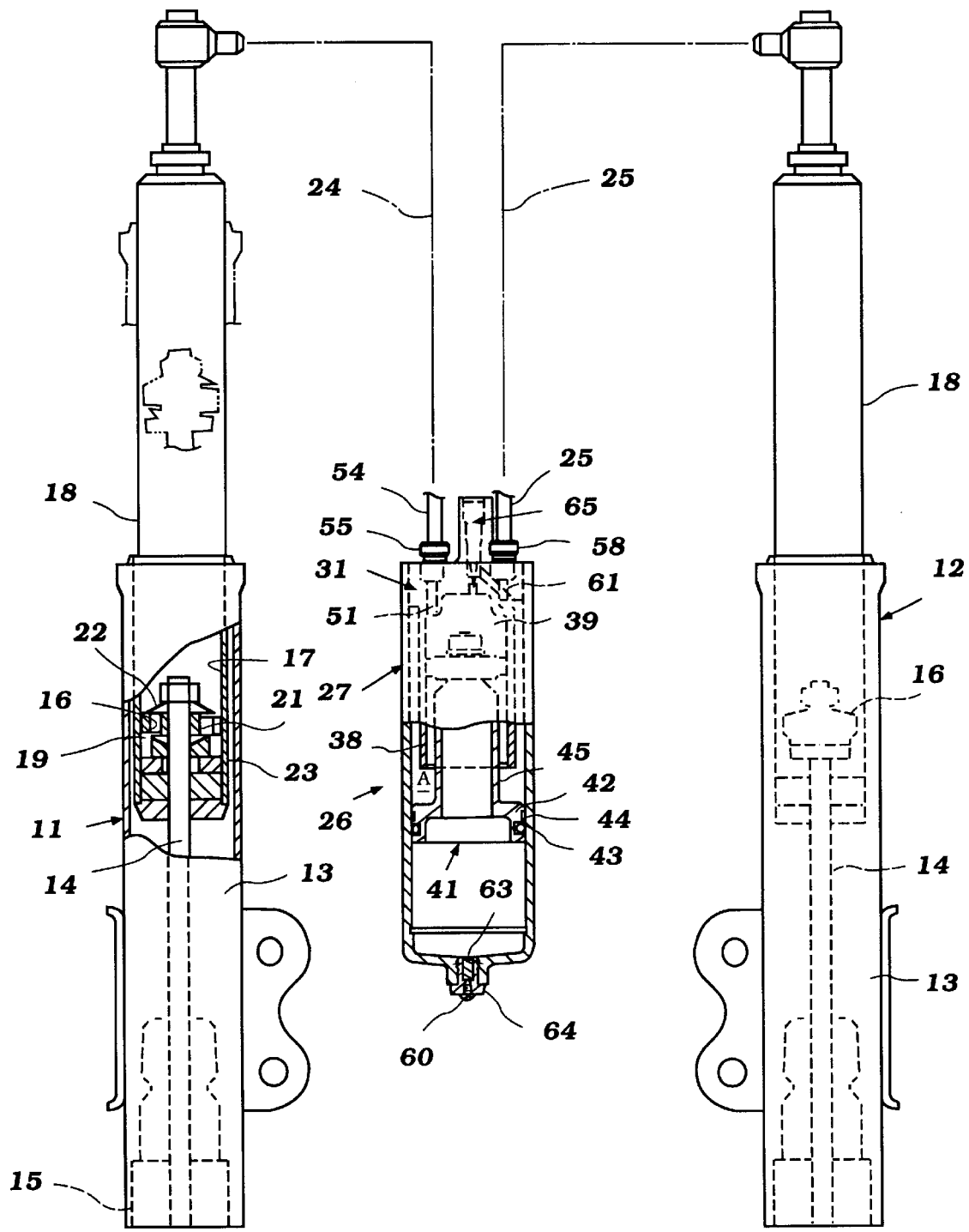
FIG. 1 is a partially schematic view showing a suspension system for a vehicle that embodies an accumulator and a flow control device constructed in accordance with an embodiment of the invention.

Referring first to FIG. 1, a pair of identical suspension units, indicated generally by the reference numerals 11 and 12, of the type utilized in the wheel suspension of a vehicle are illustrated. The suspension units 11 and 12 each include a cylinder assembly 13 that is adapted to be affixed for movement with a respective wheel suspension element of a vehicle. Each unit 11 and 12 includes a piston rod 14 that is affixed to an end closure 15 of the respective cylinder assembly 13. A piston 16 is affixed to the piston rod 14 and extends into a cylinder bore 17 formed by the remaining element 18 of each of the suspension units 11 and 12. The unit element 18 is adapted to be affixed in any suitable manner to an associated chassis of the vehicle. Hence, upon suspension movement of the respective wheel relative to the chassis, the cylinder assembly 13 slides relative to the element 18 from the full rebound condition as shown in solid lines toward the full jounced condition shown in phantom lines.

This suspension movement is dampened by controlling the flow of a contained hydraulic fluid through passages 19 and 21 formed in the piston 16. Flow controlling valves 22 and 23 cooperate with the passages 19 and 21, respectively, so as to control the pressure and rate of fluid flow through the piston 16 and accordingly the damping characteristics of the suspension system.

Figure 2:
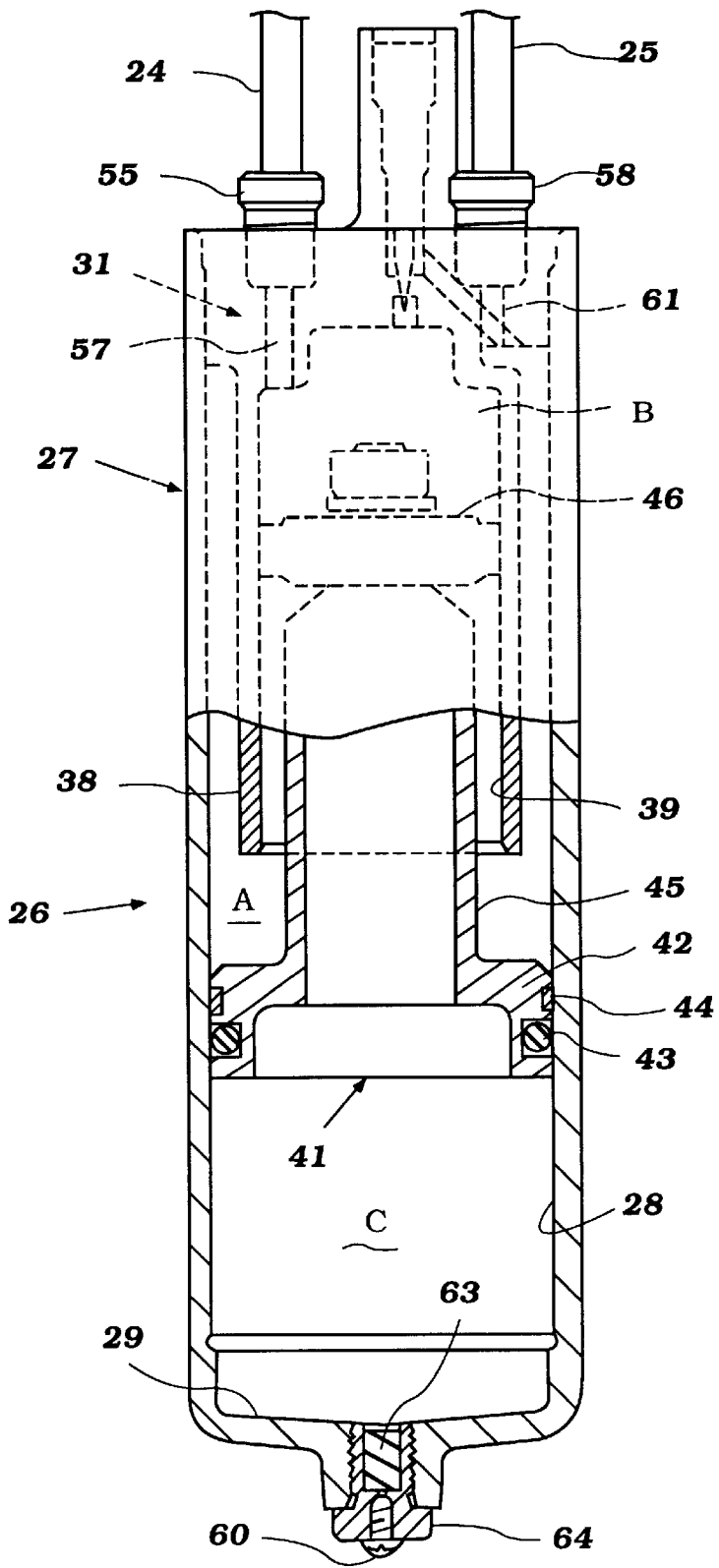
FIG. 2 is an enlarged side elevational view, with a portion broken away and shown in section, of the accumulator and flow control device of the first embodiment
Figure 3:
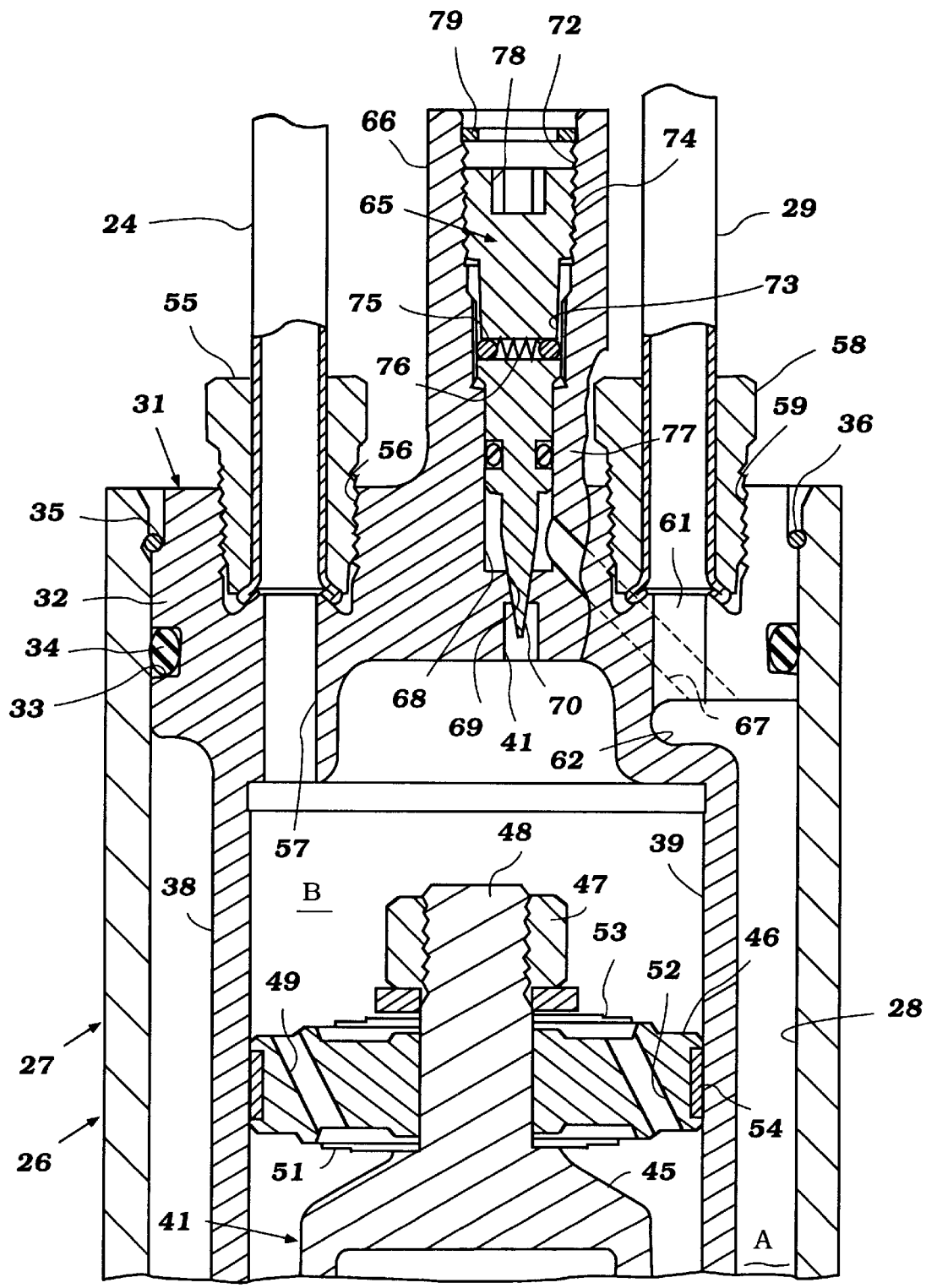
FIG. 3 is a further enlarged cross-sectional view showing the portion of the device not illustrated in cross-section in FIG. 2.
Figure 4:
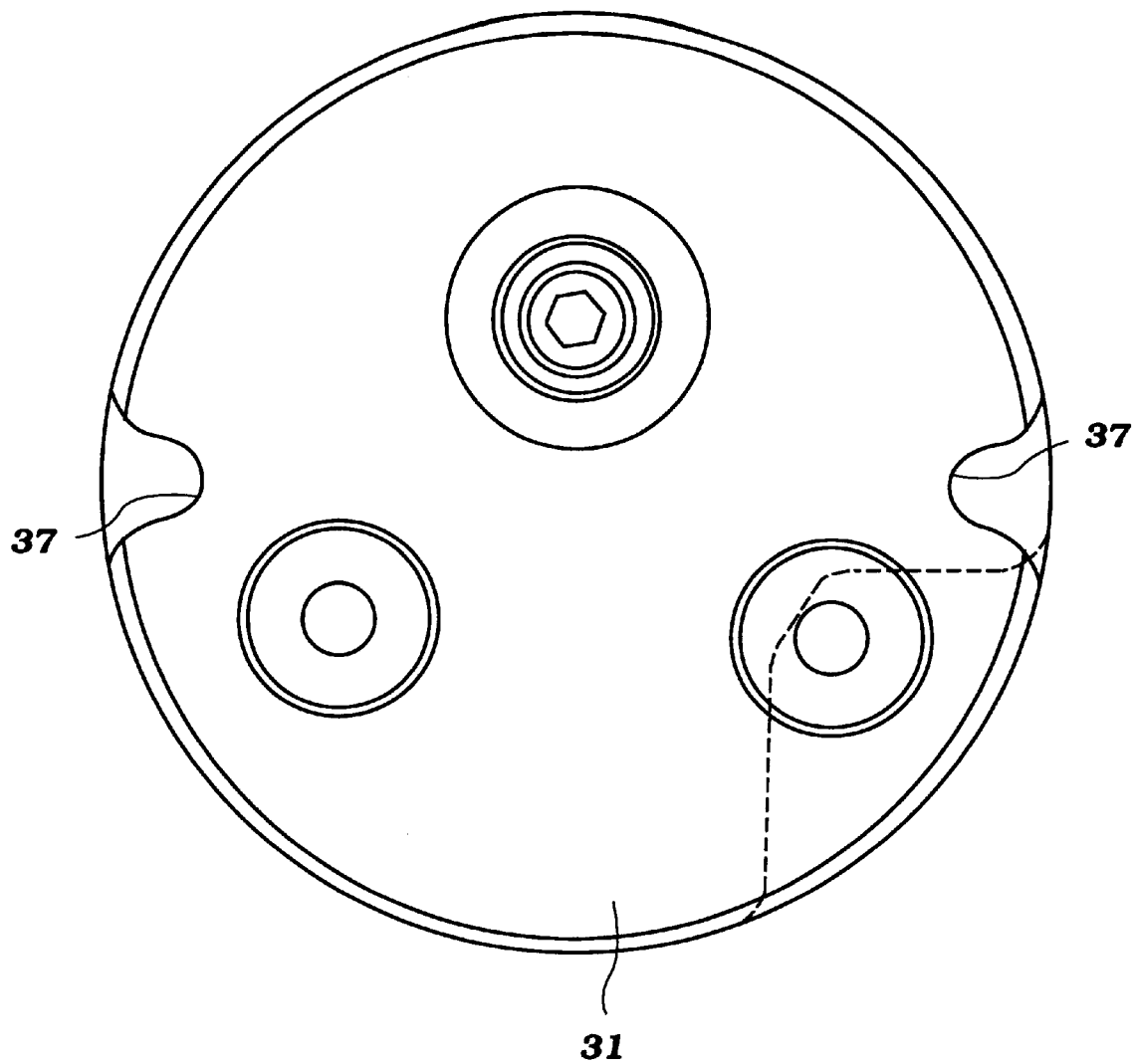
FIG. 4 is an end view looking at the top of the flow control device.

The upper chambers of the suspension units 11 and 12 are provided with fluid conduits 24 and 25 that are connected in a manner to be described to the combined accumulator and flow control device, indicated generally by the reference numeral 26 and which is constructed and operates in accordance with the invention, as will now be described by reference to FIGS. 2 through 4.

The unit 26 is comprised of a main housing member 27 which may be formed from a casting or like from a suitable material. The housing 27 defines a first cylinder bore 28 one end of which is closed by an integral end wall 29. The other end of the first cylinder bore 28 is closed by means of a detachable end cap, indicated generally by the reference numeral 31. This end cap 31 has a head portion 32 that defines a groove 33 in which an o-ring seal 34 is contained so as to seal the closure of the first cylinder bore 28. A circle clip 35 is received within a groove 36 formed in the bore 28 so as to detachably hold the end cap 31 in position.

As may be seen in FIG. 4, the end cap 31 is provided with a pair of notched recesses 37 to pass appropriate tool for inserting and removing the circle clip 35 and for another purpose which will be described. The end cap 31 has inwardly extending cylindrical projection 38 that defines a second cylinder bore 39.

An integral, compound piston assembly, indicated generally by the reference numeral 41, is positioned within the housing assembly of the device 26 formed by the main housing member 27 and the end cap 31. This piston 41 includes a first annular piston portion 42 that is slidably supported in the first cylinder bore 28. An o-ring seal 43 and nylon seal 44 provide sealing engagement with the bore 28. This piston portion 42, the bore 28, and the end closure 31 define a first fluid chamber A.

The compound piston 41 has a tubular extension 45 that extends into the second cylinder bore 39 formed by the end closure projection 38. A piston member 46 is affixed to this extension 45 by means of a fastener 47 that is connected to a threaded portion 48 formed at the upper end of the extension 45. The piston 46 forms with the second cylinder bore 39 and the end cap 31 a second fluid chamber B. It should be noted that the effective cross-sectional area of the piston 42 in the cylinder bore 28 acting in the fluid chamber A is equal to the effective area of the piston 46 in the cylinder bore 39 acting in the fluid chamber B. This is done so that when equal amounts of fluid are displaced from the two suspension units 11 and 12, there will be equal displacement of the pistons 46 and 42 in the respective chambers B and A. When this happens, there is no fluid interchanged between the chambers A and B.

A first series of passages 49 extend through the piston 46 from the chamber B to the chamber A. Flow through the passages 49 is controlled by a first plate type valve 51. A second series of passages 52 extend from the chamber A to the chamber B. These passages are valved by a second plate type valve 53. Finally, the piston 46 is provided with an annular groove in which a sealing ring 54 is received so as to seal the chambers A and B from each other.

Fluid from the suspension unit 11 is displaced into the chamber B through the conduit 24 and a fitting 55 that is threaded into a tapped opening 56 formed in the end cap 31. This fitting communicates with the chamber B through a drilled passage 57. The notches 37 will accommodate a tool to hold the end cap 31 from rotating when the fitting 55 is tightened.

In a similar manner, the suspension unit 12 communicates with the chamber A through the conduit 25 and a fitting 58 that is threaded into a tapped opening 59 in the end cap 31. The fitting 58 terminates in a drilled passageway 61 that extends into the cavity A through a recess 62 formed at the upper peripheral edge of the end cap extension 38.

In addition to the chambers A and B, the area below the piston 41 forms a further chamber C. The chamber C acts as an accumulator chamber and is filled with a pressurized inert gas such as nitrogen or the like. This gas is inserted via a hypodermic needle through a sealing element 63 that is closed by a closure plug 64 and screw 60.

In addition to providing a controlled flow of fluid from the chamber A between the chambers A and B through the piston passages 49 and 52, there is also provided a externally adjustable flow control, indicated generally by the reference numeral 65. This flow control 65 is provided in an extending portion 66 of the end cap 31.

This flow control 65 is comprised of a first drilled passageway 67 that extends into the area of the chamber A adjacent the end cap recess 62. The drilled passage 67 intersects a counter bore 68 which communicates with the chamber B through a tapered metering opening 69 and larger diameter opening 71. The counter bore 68 is formed at the base of an axially extending opening that consists of an upper threaded portion 72, a portion in which axially extending slots 73 are formed, and terminates at the counter bore 68.

The flow control 65 is comprised of a member having a screw thread 74 that engages the threads 72 and has a tapered metering end 75 that cooperates with the tapered opening 69 so as to control the effective flow area between the chambers A and B through this passage.

A pair of detent balls 70 are urged apart by a coil compression spring 76 into the slot 73 so as to hold the rotational position and provide an indication to an operator of the incremental number of turns that have been made.

Finally, an O-ring seal 77 seals the bore 68 and a socket head 78 is provided in the exposed end of the flow control 65 so that it can be turned. A snap ring 79 may be positioned at the upper end of the threaded area 72 to prevent total removal of the flow control 65.

The operation of this embodiment will now be described particularly considering in addition FIG. 1. If the wheels associated with the suspension units 11 and 12 both are displaced in the same degree and at the same velocity and in an upward direction as viewed in FIG. 1, fluid will be displaced from both of the suspension units 11 and 12 in equal amounts.

This displacement of fluid is caused because of the extension of the piston rods 14 into the lower chambers of the suspension units 11 and 12. Thus, more fluid is displaced out of the upper chamber than can be accommodated in the lower chamber. This fluid is transferred through the lines 24 and 25 to the chambers A and B. Since equal amounts of fluid are displaced, the volume of both the chambers A and B will increase to the same extent and the compressed gas in the accumulator chamber C will have its pressure increased. No flow from the chamber A to the chamber B will occur, however.

If, however, the suspension travel is such that one suspension unit or wheel moves more than the other in a given time, either the chamber A or the chamber B will tend to expand at a greater rate which is impossible since the pistons 46 and 42 are integrally connected. Thus, there must be fluid flow between the chambers A and B and this occurs through either the passages 49 or the passages 52. In addition, there will be some control flow through the orifice 69, this amount being controlled by the position of the adjusting member 65.

Hence, the effective damping rate of the suspension unit 11 or 12 having the greatest travel will be retarded over and above its internal damping. Hence, it is possible to control pitch and/or roll depending upon which wheel or wheels the units 11 and 12 are associated with.

Figure 5:
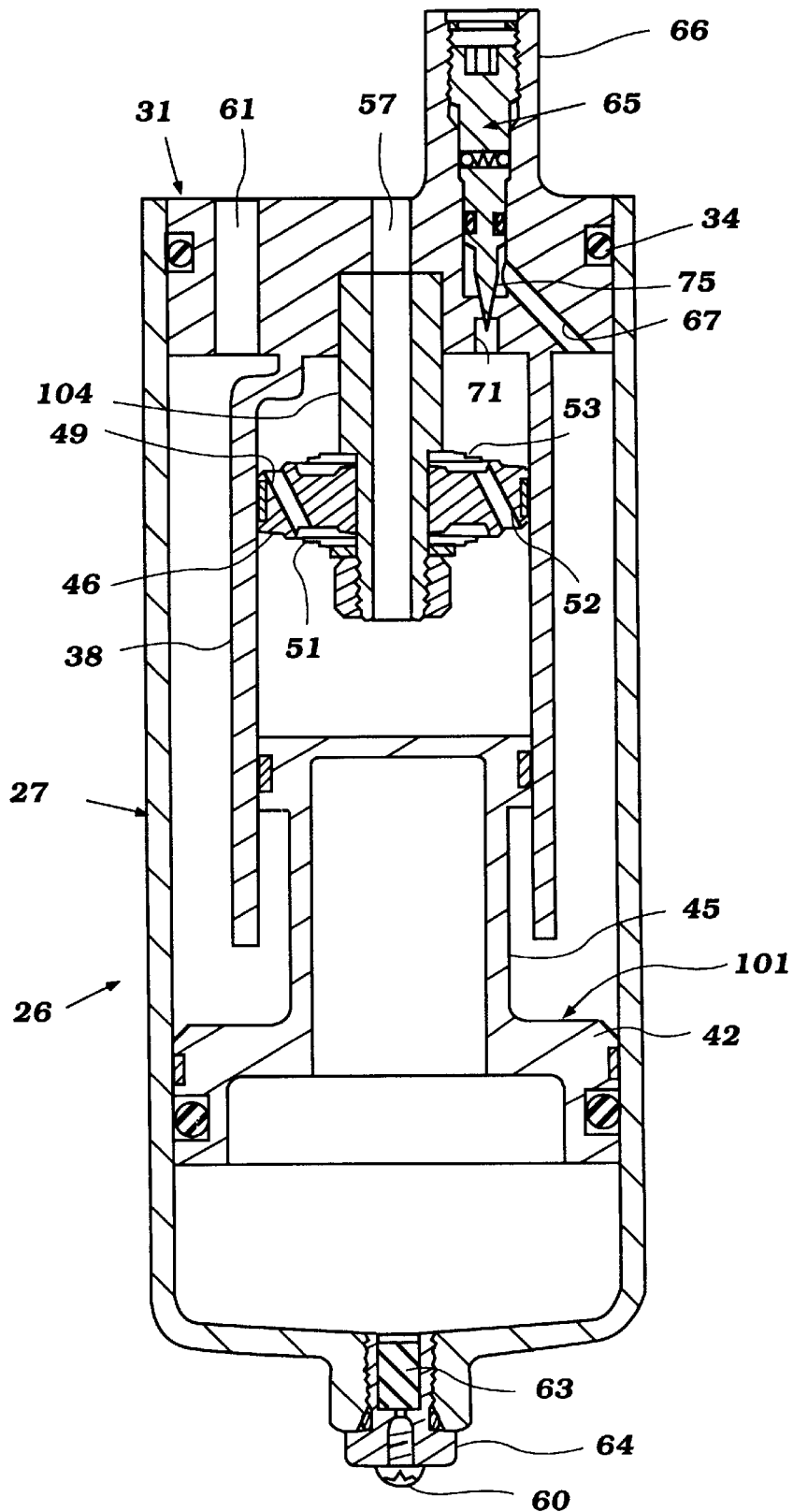
FIG. 5 is a cross-sectional view showing a further embodiment of the invention.

FIG. 5 shows another embodiment of the invention which is basically the same as the embodiment thus far described. With this embodiment, however, the piston construction is simplified, and this simplified piston is indicated by the reference numeral 101 in FIG. 5. In this case, the piston 46 is provided by an integral part of the extension 45 and the valving is deleted from this piston. Rather, the valving is provided on the end cap 31 of the unit 26 as shown in the upper side of FIG. 5.

The piston 46 has the same valving and passages of the previously described embodiment and is mounted on the end cap 31 by a mounting post 104. The mounting post 104 communicates directly with the passageway 57 in this case. The operation is exactly the same as with the previously described embodiment as should be readily apparent. Therefore, further description of this figure is not believed to be necessary.

What is claimed is:

1. An accumulator and control device for interconnection between a pair of hydraulic damping units for controlling their respective damping action comprising a housing assembly comprised of a main housing member having a first cylinder bore closed at one end by an integral end wall and a detachable end cap affixed to said main housing member and closing the other end of said first cylinder bore, said end cap having a cylindrical extension extending coaxially into said first cylinder bore and defining a second cylinder bore, a pair of integral concentric pistons received within said housing assembly, one of said pistons comprising a cylindrical piston received in said second cylinder bore and the other comprising an annular piston received in said first cylinder bore, said housing assembly, said annular piston, said first cylinder bore and said end cap defining a first fluid chamber, said cylindrical piston, said second cylinder bore and said end cap forming a second fluid chamber, each of said first and said second fluid chambers being adapted to exchange fluid with a respective one of said damping units through first and second fittings formed in said end cap, and a conduit having a flow control therein for interconnecting said fluid chambers and for controlling the flow therebetween.

2. An accumulator and control device as set forth in claim 1 wherein the conduit is provided with oppositely acting check valves for controlling the flow.

3. An accumulator and control device as set forth in claim 2 wherein the oppositely acting check valves are formed on the cylindrical piston contained within the second cylinder bore.

4. An accumulator and control device as set forth in claim 3 wherein the oppositely acting check valves are carried by the cylindrical piston.

5. An accumulator and control device as set forth in claim 3 wherein the oppositely acting check valves are carried by a further piston that is carried by the end cap and which sealingly engages the second cylinder bore.

6. An accumulator and control device as set forth in claim 1 wherein one of the fittings communicates with its respective fluid chamber through a recess formed in the end cap.

7. An accumulator and control device as set forth in claim 6 wherein the recess is formed at the upper end of the first cylinder bore.

8. An accumulator and control device as set forth in claim 1 wherein the conduit is formed at least in part by said end cap.

9. An accumulator and control device as set forth in claim 6 wherein the conduit is provided with a fixed adjustable flow control carried by the end cap and which is adjustable externally of the device.

10. An accumulator and control device as set forth in claim 9 wherein the conduit also includes a portion provided with oppositely acting check valves for controlling the flow.

11. An accumulator and control device as set forth in claim 10 wherein the oppositely acting check valves are formed on a piston contained within the second cylinder bore.

12. An accumulator and control device as set forth in claim 11 wherein the oppositely acting check valves are carried by the cylindrical piston.

13. An accumulator and control device as set forth in claim 11 wherein the oppositely acting check valves are carried by a further piston that is carried by the end cap and which sealingly engages the second cylinder bore.

14. An accumulator and control device as set forth in claim 10 wherein one of the fittings communicates with its respective fluid chamber through a recess formed in the end cap.

15. An accumulator and control device as set forth in claim 14 wherein the recess is formed at the upper end of the first cylinder bore.

16. An accumulator and control device as set forth in claim 1 wherein the cylindrical and annular accumulator pistons each define a fluid side for exchanging hydraulic fluid with the respective hydraulic damping unit and a gas pressure side with the integral end closure for receiving a pressurized gas for maintaining a pressure in the hydraulic fluid.

17. An accumulator and control device as set forth in claim 16 wherein the conduit is provided with oppositely acting check valves for controlling the flow.

18. An accumulator and control device as set forth in claim 17 wherein the oppositely acting check valves are formed on a piston contained within the second cylinder bore.

19. An accumulator and control device as set forth in claim 18 wherein the oppositely acting check valves are carried by the cylindrical piston.

20. An accumulator and control device as set forth in claim 18 wherein the oppositely acting check valves are carried by a further piston that is carried by the end cap and which sealingly engages the second cylinder bore.

21. An accumulator and control device as set forth in claim 16 wherein one of the fittings communicates with its respective fluid chamber through a recess formed in the end cap.

22. An accumulator and control device as set forth in claim 21 wherein the recess is formed at the upper end of the first cylinder bore.

23. An accumulator and control device as set forth in claim 16 wherein the conduit is formed at least in part by said end cap.

24. An accumulator and control device as set forth in claim 21 wherein the conduit is provided with a fixed adjustable flow control carried by the end cap and which is adjustable externally of the device.

25. An accumulator and control device as set forth in claim 24 wherein the conduit also includes a portion provided with oppositely acting check valves for controlling the flow.

26. An accumulator and control device as set forth in claim 25 wherein the oppositely acting check valves are formed on a piston contained within the second cylinder bore.

27. An accumulator and control device as set forth in claim 26 wherein the oppositely acting check valves are carried by the cylindrical piston.

28. An accumulator and control device as set forth in claim 26 wherein the oppositely acting check valves are carried by a further piston that is carried by the end cap and which sealingly engages the second cylinder bore.

29. An accumulator and control device as set forth in claim 25 wherein one of the fittings communicates with its respective fluid chamber through a recess formed in the end cap.

30. An accumulator and control device as set forth in claim 29 wherein the recess is formed at the upper end of the first cylinder bore.

* * * * *